United States Patent [19]

Cochran

[11] Patent Number: 4,581,487
[45] Date of Patent: Apr. 8, 1986

[54] UNIVERSAL DC FEED FOR TELEPHONE LINE AND TRUNK CIRCUITS

[75] Inventor: William T. Cochran, Milford, Conn.

[73] Assignee: ITT Corporation, New York, N.Y.

[21] Appl. No.: 629,659

[22] Filed: Jul. 11, 1984

[51] Int. Cl.[4] .......................................... H04M 19/08
[52] U.S. Cl. .................................. 179/77; 179/70; 179/23
[58] Field of Search ................... 179/77, 70, 55, 16 F, 179/18 FA, 23

[56] References Cited

U.S. PATENT DOCUMENTS

| | | | |
|---|---|---|---|
| 3,515,809 | 6/1970 | Herter | 179/18 |
| 3,519,743 | 7/1970 | Herter | 178/58 |
| 3,525,816 | 7/1966 | Herter | 179/18 |
| 3,546,392 | 12/1970 | Herter | 179/18.3 |
| 3,748,395 | 7/1973 | Herter | 179/18 FA |
| 3,821,486 | 6/1974 | Mussman | 179/18 FA |
| 4,315,106 | 2/1982 | Chea | 179/16 F |
| 4,317,963 | 3/1982 | Chea | 179/77 |
| 4,387,273 | 6/1983 | Chea | 179/16 F |
| 4,419,542 | 12/1963 | Embree | 179/77 |
| 4,514,595 | 4/1985 | Rosenbaum et al. | 179/16 F |

OTHER PUBLICATIONS

Line Circuit, Electronics, Feb. 24, 1983, pp. 118, 119.

Primary Examiner—Stafford D. Schreyer
Attorney, Agent, or Firm—Peter C. Van Der Sluys

[57] ABSTRACT

Circuit apparatus for supplying a loop current to a two conductor loop telephone line includes first and second differential amplifiers each having the same gain factor. The first amplifier is coupled to one side of the line via a series resistance, while the second amplifier is coupled to the other side of the line via a series resistance of the same magnitude. A feedback amplifier has one input terminal coupled to one side of the line and another input terminal coupled to the other side of the line. The inputs of the feedback amplifier are further coupled to the outputs of the above differential amplifers. The output of the feedback amplifier is coupled to the input of a variable gain amplifier which has its output coupled to an input terminal of the first differential amplifier. The first differential amplifier receives a voltage reference source at its other input which source controls the magnitude of the current supplied to the line circuit. To accommodate different system characteristics, the gain of the gain controllable amplifier is varied which effectively varies the equivalent feed resistor for the subscriber line. Hence one may vary the gain of the amplifer to achieve a wide variation in feed resistance while employing a minimum number of components and a fixed reference voltage.

13 Claims, 2 Drawing Figures

UNIVERSAL DC FEED FOR TELEPHONE LINE AND TRUNK CIRCUITS

BACKGROUND OF THE INVENTION

This invention relates generally to the supply of electrical current to a telephone subscriber loop and more particularly to the supply of line current to a telephone loop employing a fixed reference voltage to accommodate a wide variety of different subscriber requirements.

The prior art contains a number of patents descriptive of circuitry which circuitry supplies line current to a telephone subscriber loop. Essentially, various circuits described in prior art patents serve to maintain a constant or an efficient line current in a telephone subscriber loop, the length of which may vary, and, therefore, the resistance of the line may vary depending upon the distance from the subscriber to the central office. The line feed function associated with a classic telephone circuit is equivalent to two resistors each in series with one terminal of the central office battery.

The value of the battery is in the range of 48 to 60 volts, and the series resistors typically vary between 200 to 11K ohms or greater depending upon the particular telephone exchange. The line feed resistors are selected at the central office of a value necessary to produce the proper line current versus loop resistance characteristics as expected by the telephone instrument. As is understood, a long telephone line indicates a larger resistance, while a short line has a lower resistance. The line feed resistors are placed in series with the telephone line and selected according to the desired loop current characteristics.

As is known, these resistors dissipate power and may create thermal problems. As above indicated, certain of the systems of the prior art attempt to circumvent the power dissipation problem by providing a constant current to a telephone line which is relatively independent of the length of the line.

For examples of suitable systems reference is made to U.S. Pat. No. 4,315,106 entitled APPARATUS FOR REGULATING CURRENT SUPPLIED TO A TELEPHONE LINE SIGNAL OF THE TYPE EMPLOYED IN DIGITAL TELEPHONE SYSTEMS by R. C. W. Chea., Jr. and assigned to International Telephone and Telegraph Corporation, the assignee herein. Another pertinent patent in U.S. Pat. No. 4,317,963 entitled SUBSCRIBER LINE INTERFACE CIRCUIT UTILIZING IMPEDANCE SYNTHESIZER AND SHARED VOLTAGE SOURCE FOR LOOP CURRENT REGULATION CONTROL by R. C. W. Chea, Jr. and assigned to International Telephone and Telegraph Corporation, the assignee herein and issued on Mar. 2, 1982. A third patent of interest in U.S. Pat. No. 4,387,273 entitled "SUBSCRIBER LINE INTERFACE CIRCUIT WITH IMPEDANCE SYNTHESIZER" by R. C. W. Chea, Jr. and assigned to International Telephone And Telegraph Corporation, the assignee herein.

Essentially, the objects of the above noted patents are to supply a current to a telephone subscriber line from a given voltage source and to maintain that current at an efficient value so as to reduce dissipation in the line circuit and to overall reduce the complexity of the line circuit. A major reason for reducing complexity and power dissipation in a line circuit is inherent with the fact that the line circuit in a telephone is associated with each subscriber.

Hence the number of line circuits in a telephone system is equal to the number of subscribers and, as one can ascertain, can be an extremely large number in the case of a large switching system. An example of an extremely successful telephone system is designated as the ITT 1240 System. This system is employed throughout the world and exists as the major switching system in many countries. The system is extremely popular, and there is a great deal of information concerning the operation of the system in the patent literature as well as in technical periodicals. For example, see an article entitled "ITT 1240 Digital Exchange Switching Network" by J. M. Cotton et al, published in ELECTRICAL COMMUNICATION, Volume 56, 1981.

Essentially, the technique used in supplying line current to a subscriber telephone line or a trunk is to change a reference voltage in the line circuit to accommodate the change in central office battery and thereafter to change the gain of the impedance synthesis loop to accommodate the change in the series resistances which as indicated are placed in series with the central office battery. This technique is applied for each of the required feed characteristics of the various systems employed.

For an example of such a technique, reference is made to U.S. Pat. No. 4,317,963 as indicated above. Based on the above, it is again noted that traditional line feed characteristics used in telephone systems are derived from a constant voltage which is the central office "talk" battery in series with a pair of equal valued resistors or feed resistors which serve to maintain longitudinal balance. Accordingly, many telephone sets are equalized for line length variation using this line feed assumption. Certain government authorities such as the British Post Office have agreed to use constant current to save power, but they consequently require gain compensation in the line circuit to allow for the loss of equalization which is built into the constant voltage telephone set.

It is thus an object of the present invention to provide a circuit for supplying line current to a subscriber line which circuit affords low power dissipation and which eliminates the need for constant current and the consequent gain control as utilized in the prior art.

A further object of the present invention is to provide a circuit for supplying line current which requires no changes in loop gain to accommodate the changes in feed requirements based on different system characteristics.

BRIEF DESCRIPTION OF THE PREFERRED EMBODIMENT

A line circuit for supplying a loop current to a two-wire telephone subscriber line, said telephone line connected between first and second terminals at a subscriber location manifesting a given line impedance, comprising first and second differential amplifiers each of the same gain factor, with said first amplifier having a first and second input terminals and with said second amplifier having an input terminal coupled to a source of reference potential with one input of said first amplifier coupled to a voltage reference source, with the output of said first amplifier coupled to one terminal of said line via a first given resistor, and with the output of said second amplifier coupled to the other terminal of said line via a second resistor of the same magnitude. A differential feedback amplifier having one input terminal coupled to one terminal of said line and a second input coupled to the other terminal of said line and having an output terminal, a gain controllable amplifier having an input terminal coupled to the output terminal of said feedback amplifier and an output terminal coupled to said other input of said first differential amplifier and means coupled to said gain controllable amplifier for varying the gain to provide a given current to said line according to the value of said gain as varied.

DETAILED DESCRIPTION OF THE FIGURES

Figure 1:
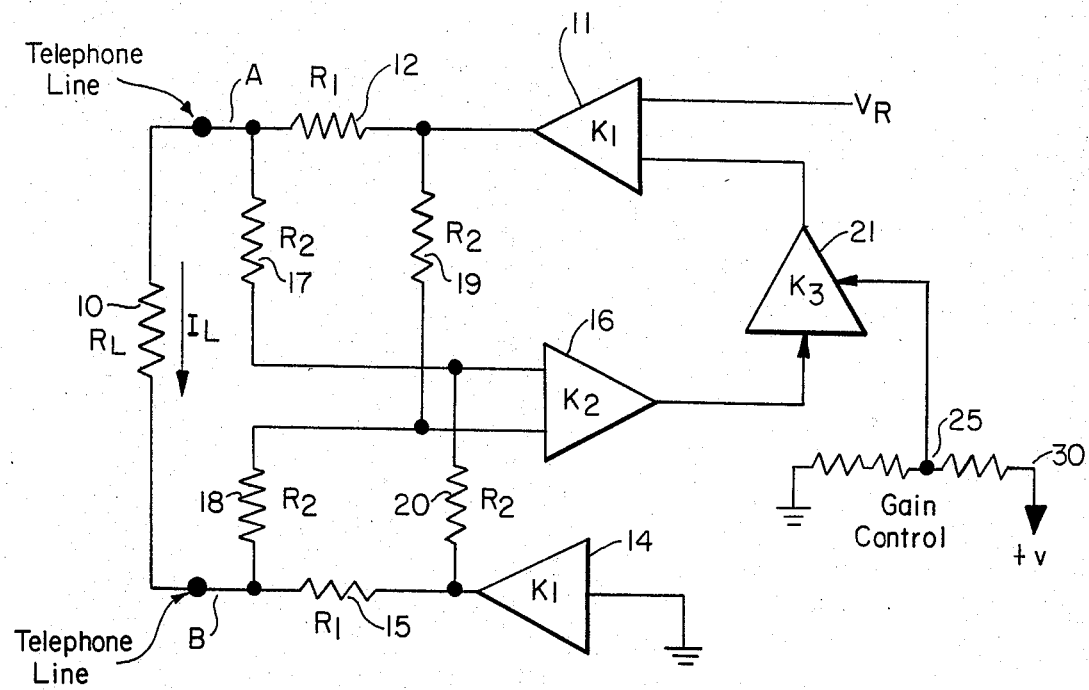
FIG. 1 is a detailed schematic diagram of a universal telephone line feed circuit.

Referring to FIG. 1, there is shown a schematic diagram of the feed circuit for a typical subscriber line. Essentially, numeral 10 represents the line resistor also designated as $R_L$. This resistance 10 represents the line resistance of the subscriber line and is a function of the length of the line from the central office. Therefore, the longer the line, the higher the value of resistor 10; and the shorter the line, the lower the value. Essentially, the resistance $R_L$ represents the resistance of the line including the impedance of the telephone subset. As indicated, a constant voltage telephone set is a term used in telephony which means that the telephone set is designed to work with a switching system that provides battery voltage through a balanced pair of resistors. As the loop length increases, the current to the telephone set decreases making it somewhat less efficient. In a telephone set that is equalized, the efficiency of the telephone set does not decrease with loop length.

As seen from the FIG. 1, the line resistor 10 is fed with a current $I_L$ which current is supplied by a first differential amplifier 11 and a second differential amplifier 14. The differential amplifier 11 has a gain designated as $K_1$ and has its output terminal in series with a resistor 12 designated as $R_1$. One terminal of resistor 12 is coupled to one terminal (A) of the telephone line. The output of amplifier 14 is coupled to the other terminal (B) of the telephone line via the resistor 15, $R_1$ of the same value as resistor 12. The input of amplifier 14 is coupled to a source of reference potential such as ground. A feedback amplifier 16 has one input supplied through a resistor 17 coupled to terminal A of the line and designated as $R_2$ while the other input is supplied through a resistor 18 also designated as $R_2$ and coupled to the other side B of the line. The output terminals of amplifiers 11 and 14 are further coupled to the inputs of amplifier 16 via resistors 19 and 20 which are of the same magnitude as resistors 17 and 18. These resistors 17, 18, 19 and 20 are selected to be 1,000 or more times greater than resistors 12 and 15.

The output of amplifier 16 is coupled to the input of amplifier 21 having its output coupled to the input of amplifier 11. A further input to amplifier 11 is coupled to a voltage reference source designated as $V_R$.

As can be seen from FIG. 1, amplifier 16 has a gain factor designated as $-K_2$, while amplifier 21 has a gain factor designated as $K_3$. The amplifier 21 is a gain controllable amplifier whereby the actual gain factor of the amplifier is controlled according to the system requirements. Thus the value of the gain of amplifier 21 is set so that for an active line circuit the circuit gives the line an equivalent feed resistance of 200 ohms. For an idle line circuit the gain may be set to give an equivalent feed resistance of 4,200 ohms. The values of $K_1$, $-K_2$ and $K_3$ are only individually relatively important to control signal level.

As will be explained, the product of $K_1 K_2 K_3 2 R_1$ is to provide the synthesized resistance so that a value of feed resistance is specified for each line circuit in the range of 200 to 11,600 ohms. Typical values are $K_1=1$, $-K_2=0.6$ and $K_3$ is set to give the equivalent feed resistance as between 200 to 11,600 ohms. As can be seen from the above noted circuit, the current $I_L$ is defined by the following equation:

$$I_L = (K_1 V_R)/(R_L + K_1 K_2 K_3 (2R_1))$$

As one can see, the value of $V_R$ is a constant value. The expression for the line current $I_L$ has exactly the same form as that required by standard feed characteristics which essentially is seen by the following equation:

$$I_L = V_B/(R_L + 2R_F)$$

Figure 2:
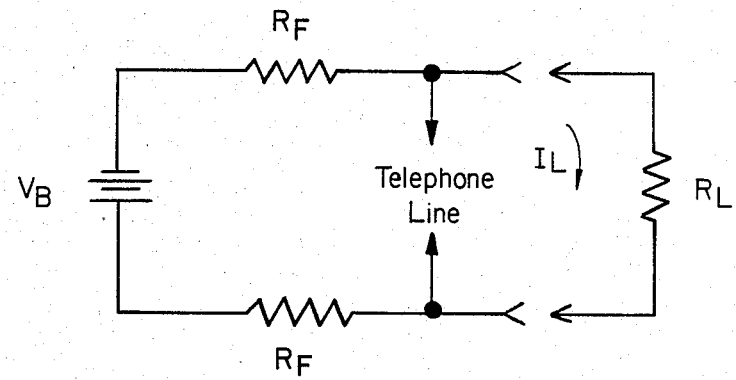
FIG. 2 is a simple schematic diagram showing a classic telephone line feed circuit.

If reference is made to FIG. 2, there is shown a typical diagram of a prior art telephone circuit. In the circuit the central office battery $V_B$ has each terminal coupled through a series resistance $R_F$ which as indicated is the feed resistance and may vary between 200 to 11,600 ohms. The resistance $R_L$ as shown is the line resistance including the resistance of the telephone subset.

Thus as can be seen, the current $I_L$ in the circuit of FIG. 2 is essentially governed by the above noted equation. In regard to the circuit of FIG. 1, the following relationships exist: $V_B$ is equal to $K_1 V_R$, while the term $2R_F$ is equal to $K_1 K_2 K_3 (2R_1)$. Thus as indicated, the equations for line current in both circuits are of the same form. The circuit shown in FIG. 1, as indicated, has the following advantages—namely, that $V_R$ is constant and can be employed to supply battery to any telephone system. The circuit shown in FIG. 1 also utilizes fewer elements in the synthesis loop and hence is less expensive than prior art circuits.

The purpose of the circuit of FIG. 1 is to fix the voltage and the resistance so that as many feed characteristics as possible are implemented using these fixed values. Thus as one can ascertain, the only variable necessary in regard to the circuit of FIG. 1 would be the gain of amplifier 21. Amplifier 21 as indicated is a gain controllable amplifier whereby a fixed value or voltage may be impressed upon the gain control terminal 25 to thereby specify the gain of amplifier $K_3$. This is shown schematically by means of a voltage divider 30 having the arm of a potentiometer coupled to terminal 25.

As one can see from the above noted equations, once the gain of amplifier $K_3$ is specified, this essentially specifies the equivalent value of the feed resistor as $R_F$ of FIG. 2. Thus the feed resistor can be adjusted for each line, and, therefore, many subscriber lines can be accommodated by the circuit of FIG. 1 and by merely adjusting the gain of amplifier 21. This is extremely important as the current required by a telephone system to indicate that a telephone has gone off hook depends upon the value of this feed resistance $R_F$. Thus in the circuit shown in FIG. 1, the feed resistance can be accurately controlled by controlling the gain of amplifier 21, and this can be done leaving all other components at a fixed value including the reference voltage $V_R$.

Thus the line feed characteristics for different switching systems and different telephone sets can be accommodated by the circuit of FIG. 1 without the problems of changing circuit components for each different system. Furthermore the gain of amplifier $K_3$ can be controlled by a software program which will generate a sufficient gain control value to be applied to control terminal 25 for each different system. As is known, systems as the ITT 1240 are distributed control systems and employ microprocessors for controlling line circuit and others system functions. Hence one can afford gain control by a suitable software format or program to further reduce the complexity of the system and to eliminate variable components such as the potentiometer.

I claim:

1. A universal d.c. feed circuit for supplying loop current to a two-wire telephone subscriber line connected to a telephone subset and having first and second terminals, said feed circuit comprising:

first and second differential amplifiers each of equal gain factor, with said first amplifier having first and second input terminals and with said second amplifier having an input terminal for connection to a source of reference potential, with one input of said first amplifier for connection to a predetermined fixed voltage reference source, with an output of said first amplifier coupled to one terminal of said line via a first resistor having a predetermined magnitude, and with an output of said second amplifier coupled to the other terminal of said line via a second resistor of equal magnitude to the first resistor;

a differential feedback amplifier having one input terminal coupled to one terminal of said line and a second input coupled to the other terminal of said line and having an output terminal;

an amplifier having a controllable gain, an input terminal coupled to the output terminal of said feedback amplifier and an output terminal coupled to said other input of said first differential amplifier; and means coupled to said gain controllable amplifier for varying the gain to provide a given current to said line according to the gain as varied, whereby the feed circuit can accommodate the varied line feed characteristics of different telephone subsets used in different switching systems having different battery voltages by merely varying the gain of the gain controllable amplifier.

2. The feed circuit according to claim 1, wherein said gain factor of said first and second differential amplifiers is equal to one.

3. The feed circuit according to claim 1, wherein said feedback amplifier has a negative gain factor.

4. The feed circuit according to claim 3, wherein said gain factor is 0.6.

5. The feed circuit according to claim 1, wherein the loop current ($I_L$) supplied to said subscriber line is defined by:

$$I_L = (K_1 V_R)/(R_L + K_1 K_2 K_3 (2R_1))$$

where $K_1$ = gain factor of said first and second differential amplifiers $V_R$ = value of voltage reference source = constant;

$K_2$ = gain factor of said feedback amplifier;

$K_3$ = gain of said gain controllable amplifier; and $R_1$ = value of said first given resistor.

6. A universal d.c. feed circuit for supplying loop current to a two-wire telephone subscriber line connected to a telephone subset and having first and second terminals, said feed circuit comprising:

first and second differential amplifiers each of equal gain factor, with said first amplifier having first and second input terminals and with said second amplifier having an input terminal for connection to a source of reference potential, with one input of said first amplifier for connection to a predetermined fixed voltage reference source, with an output of said first amplifier coupled to one terminal of said line via a first resistor having a predetermined magnitude, and with an output of said second amplifier coupled to the other terminal of said line via a second resistor of equal magnitude to the first resistors;

a differential feedback amplifier having one input terminal coupled to one terminal of said line via a third resistor of a given magnitude and a second input terminal coupled to the other terminal of said line via a fourth resistor of equal magnitude to the third resistor, with said one input terminal of said feedback amplifier further coupled to the output terminal of said second differential amplifier and with the second input terminal coupled to the output terminal of said first differential amplifier, and said feedback amplifier having an output terminal;

an amplifier having a controllable gain, an input terminal coupled to the output of said feedback amplifier and an output terminal coupled to said other input of said first differential amplifier; and means coupled to said gain controllable amplifier for varying the gain to provide a given current to said line according to the gain as varied, whereby the feed circuit can accommodate the varied line feed characteristics of different telephone subsets used in different switching systems having different battery voltages by merely varying the gain of the gain controllable amplifier.

7. The feed circuit according to claim 6, wherein the loop current ($I_L$) supplied to said subscriber line is defined by:

$$I_L = (K_1 V_R)/(R_L + K_1 K_2 K_3 (2R_1))$$

where, $K_1$ = gain factor of said first and second differential amplifiers;

$V_R$ = value of voltage reference source = constant;

$K_2$ = gain factor of said feedback amplifier;

$K_3$ = gain of said gain controllable amplifier; and $R_1$ = value of said first given resistor.

8. The feed circuit according to claim 6, wherein said input terminals of said feedback amplifier as coupled to said output terminals of said differential amplifiers are coupled via fifth and sixth resistors each of equal magnitude.

9. The feed circuit according to claim 8, wherein the magnitude of said fifth and sixth resistors is equal to the magnitude of said third and fourth resistors.

10. A universal d.c. feed circuit for supplying loop current to a two-wire telephone subscriber line, said telephone line connected between first and second terminals at a subscriber location manifesting a given line impedance, comprising:

first and second differential amplifiers each of equal gain factor, with said first amplifier having first and second input terminals and with said second amplifier having an input terminal for connection to a source of reference potential, with one input of said first amplifier for connection to a predetermined fixed voltage reference source, with an output of said first amplifier coupled to one terminal of said line via a first given resistor having a predetermined magnitude, and with an output of said second amplifier coupled to the other terminal of said line via a second resistor of equal magnitude to the first resistor;

a differential feedback amplifier having first and second input terminals and a given gain factor, with said first input terminal coupled to one terminal of said line via a third resistor of a given value, and coupled to the output of said second differential amplifier via a fourth resistor of said given value, with said second input terminal coupled to the other terminal of said line via a fifth resistor of said given value and coupled to the output terminal of said first amplifier via a sixth resistor of said given value, and having an output terminal;

an amplifier having a controllable gain, an input terminal coupled to said output terminal of said feedback amplifier and having an output terminal coupled to said other input of said first differential amplifier; and means for controlling the gain of said gain controllable amplifier to provide a given line current to said line according to the gain as controlled, whereby the feed circuit can accommodate the varied line feed characteristics of different telephone subsets used in different switching systems having different battery voltages by merely varying the gain of the gain controllable amplifier.

11. The feed circuit according to claim 10, wherein the gain factor of said first and second differential amplifiers is one.

12. The feed circuit according to claim 10, wherein said gain factor of said feedback amplifier is $-0.6$.

13. The feed circuit according to claim 10, wherein said loop current ($I_L$) supplied to said subscriber line is defined by:

$$I_L = (K_1 V_R)/(R_L + K_1 K_2 K_3 (2R_1))$$

where, $V_R$ = value of voltage reference source = constant;
$K_1$ = gain factor of said first and second differential amplifiers;
$K_2$ = gain factor of said feedback amplifier;
$K_3$ = gain of said gain controllable amplifier; and
$R_1$ = value of said first and second resistors.

* * * * *